US010167081B2

(12) United States Patent
Gallant et al.

(10) Patent No.: US 10,167,081 B2
(45) Date of Patent: Jan. 1, 2019

(54) FLYING WING WITH SIDE CARGO COMPARTMENT

(71) Applicant: Airbus Operations (SAS), Toulouse (FR)

(72) Inventors: Guillaume Gallant, Lareole (FR); Romain Delahaye, Colomiers (FR)

(73) Assignee: AIRBUS OPERATIONS SAS, Toulouse (FR)

(*) Notice: Subject to any disclaimer, the term of this patent is extended or adjusted under 35 U.S.C. 154(b) by 679 days.

(21) Appl. No.: 14/139,295

(22) Filed: Dec. 23, 2013

(65) Prior Publication Data

US 2014/0175215 A1    Jun. 26, 2014

(30) Foreign Application Priority Data

Dec. 26, 2012 (FR) .................... 12 62802

(51) Int. Cl.

| B64C 39/10 | (2006.01) |
|---|---|
| B64D 9/00 | (2006.01) |
| B64C 1/14 | (2006.01) |
| B64F 1/30 | (2006.01) |
| B64F 1/32 | (2006.01) |
| B64D 11/00 | (2006.01) |
| B64C 1/00 | (2006.01) |

(52) U.S. Cl.
CPC ............. *B64C 39/10* (2013.01); *B64C 1/1423* (2013.01); *B64D 9/00* (2013.01); *B64D 9/003* (2013.01); *B64D 11/00* (2013.01); *B64F 1/30* (2013.01); *B64F 1/32* (2013.01); *B64C 2001/0036* (2013.01); *B64C 2039/105* (2013.01)

(58) Field of Classification Search
CPC .............. B64C 39/10; B64C 2039/105; B64C 2001/0045
See application file for complete search history.

(56) References Cited

U.S. PATENT DOCUMENTS

| 5,088,661 | A  * | 2/1992 | Whitener ................ B64C 1/061 244/100 R |
|---|---|---|---|
| 6,568,632 | B2 * | 5/2003 | Page ..................... B64C 1/0009 244/120 |
| 6,578,798 | B1 | 6/2003 | Dizdarveic et al. |
| 6,595,466 | B2 * | 7/2003 | Depeige ................. B64C 39/02 244/118.3 |
| 6,923,403 | B1 | 8/2005 | Dizdarveic et al. |
| 7,093,798 | B2 * | 8/2006 | Whelan ................ B64C 1/0009 244/120 |
| 7,793,884 | B2 * | 9/2010 | Dizdarevic ........... B64C 1/0009 244/117 R |

OTHER PUBLICATIONS

French Search Report, dated Sep. 6, 2013.
Design of the Blended Wing Body Subsonic Transport, Liebeck, Jan. 1, 2004.

* cited by examiner

*Primary Examiner* — Brian M O'Hara
(74) *Attorney, Agent, or Firm* — Greer, Burns & Crain, Ltd.

(57) ABSTRACT

Optimization of the use of the available volume in a flying wing for commercial passenger transport, in particular for short- or medium-haul routes. A flying wing is provided including a passenger cabin together with at least one hold for the transport of luggage and/or goods, in which the hold is positioned laterally relative to said passenger cabin.

9 Claims, 2 Drawing Sheets

FLYING WING WITH SIDE CARGO COMPARTMENT

CROSS-REFERENCES TO RELATED APPLICATIONS

This application claims the benefit of the French patent application No. 1262802 filed on Dec. 26, 2012, the entire disclosures of which are incorporated herein by way of reference.

BACKGROUND OF THE INVENTION

The present invention relates to the field of commercial air passenger transport, in particular over distances corresponding to the fields known as "short-haul" and "medium-haul".

The invention relates more particularly to a flying wing designed for this purpose, and also an installation for an airport, specially designed for boarding and deplaning of passengers and luggage and/or goods to/from said flying wing.

A flying wing is an aircraft formed entirely of a wing surface, and therefore having no fuselage or empennage. All the moving surfaces used for control are therefore incorporated in the wing surface.

Commercial transport airplanes are habitually constructed by superposing a passenger cabin, firstly, and one (or more) hold(s), secondly. The latter are generally positioned beneath the passenger cabin.

Flying wings provide an interesting alternative to airplanes, due to their advantageous aerodynamic properties, and they also have large carrying capacities.

However, a simple transposition from an airplane construction to a flying wing results in a flying wing with a large transverse section, which greatly impinges its performance, particularly in the case of a flying wing intended to board a relatively small number of passengers, for example fewer than 200 passengers, such as a flying wing intended to fly short-haul or medium-haul commercial routes.

SUMMARY OF THE INVENTION

One aim of the invention is notably to provide a simple, economic and efficient solution to this problem.

To this end it proposes a flying wing for passenger transport, having a leading edge, and including a passenger cabin fitted with multiple passenger seats, together with a hold for the transport of luggage and/or goods.

According to the invention the (or each) hold of the flying wing is positioned laterally relative to the passenger cabin, and the (or each) hold is fitted with at least one hold access door incorporated in the leading edge of said flying wing and leading to the hold.

The invention thus proposes a flying wing design in which no hold is positioned under the passenger cabin.

A design of this kind allows optimum use of the internal volume of the flying wing, and thus allows the flying wing to be given a very slender profile. The invention thus enables the performance of the flying wing to be optimized.

The construction design proposed by the invention is thus particularly advantageous for a flying wing intended to board fewer than 200 passengers, notably to fly commercial routes of the short-haul or medium-haul type.

"Short-haul" is understood to mean routes over distances of less than 500 km, and "medium-haul" is understood to mean routes over distances of between 500 km and 5000 km.

The (or each) hold is of course separated from the passenger cabin by means of a partition. Such a partition typically extends in a roughly vertical direction.

In order to maximize the benefits from the invention, the flying wing is preferably of the simple deck type.

In a preferred embodiment of the invention the (or each) hold is delimited at its base by a floor extending to a height greater than or equal to that of a floor of the passenger cabin.

In addition, the (or each) hold is advantageously interposed between the passenger cabin and a fuel tank.

The hold thus forms a buffer zone which can protect the passenger cabin from a possible fire in said fuel tank.

The passenger cabin advantageously has at least one passenger access door incorporated in the leading edge of the flying wing and positioned beside one of said at least one hold access door.

The hold access door and passenger access door can thus be positioned roughly at the same height, so as to facilitate the boarding of passengers and the loading of luggage and/or of goods in a joint fashion, by means of an airport installation designed to this end, as will be shown more clearly in what follows.

In the preferred embodiment of the invention there are two such holds, and they are positioned respectively either side of the passenger cabin.

The space available in the flying wing on each side of the passenger cabin can thus be used optimally.

In this case the access doors of the passenger cabin are advantageously divided into at least one pair of passenger access doors positioned respectively either side of a median vertical plane of the flying wing. Moreover, each of the two passenger access doors is preferably incorporated in the leading edge of said flying wing and positioned next to one of said at least one hold access door of the corresponding hold.

In the preferred embodiment of the invention, the seats of the passenger cabin are distributed in a central longitudinal space and in two lateral longitudinal spaces, and the passenger cabin has two longitudinal corridors, respectively separating said central longitudinal space from each of said two lateral longitudinal spaces. In addition, the two passenger access doors of said at least one pair of passenger access doors are positioned so as to lead respectively to said two longitudinal corridors The invention also relates to an access structure for a boarding and deplaning installation of an airport, including a passenger transit space and a transit space for luggage and/or goods, fitted with a conveyor system. Said access structure has a facade including two doors positioned side-by-side, one of which is a passenger door leading to said passenger transit space, and the other door is a door for luggage and/or goods leading to said transit space for luggage and/or goods.

The invention thus provides a unified access structure allowing joint boarding or deplaning of passengers, and loading or unloading of luggage and/or of goods.

Boarding and deplaning can thus be greatly accelerated.

The invention also relates to an installation for boarding and deplaning for an airport, including two access structures of the type described above, positioned facing one another so as to allow a flying wing of the type described above to park, in a manner such that at least one portion of said leading edge of the flying wing is positioned between said access structures, such that the passenger access doors of the flying wing are positioned respectively opposite the respective passenger doors of said access structures, and that the respective hold access doors of said holds of the flying wing are positioned respectively opposite the respective luggage and/or goods doors of said access structures.

The flying wing can thus be loaded or unloaded concomitantly through all the access doors of the passenger cabin and of each hold of the flying wing.

The two access structures are preferably arranged in a V shape.

The invention also relates to an airport including at least one access structure and/or at least one installation of the type described above.

Finally, the invention relates to a method for loading or unloading a flying wing of the type described above, including the boarding or deplaning of passengers through a passenger transit space of at least one access structure of the type described above and, in parallel, the loading or unloading of luggage and/or goods by means of the conveyor system fitted in the transit space for luggage and/or goods of said access structure.

BRIEF DESCRIPTION OF THE DRAWINGS

The invention will be better understood, and other details, advantages and characteristics of it will appear, on reading the following description given as a non-restrictive example, with reference to the appended illustrations, in which.

DETAILED DESCRIPTION OF THE PREFERRED EMBODIMENTS

Figure 1:
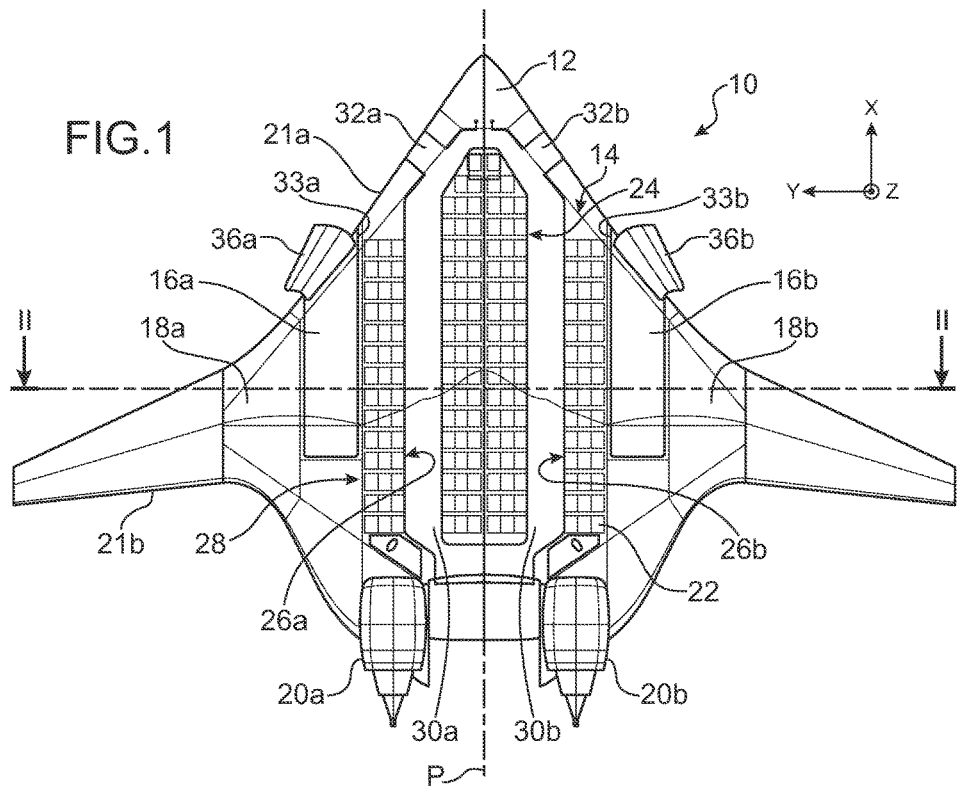
FIG. 1 is a schematic top view of a flying wing according to a preferred embodiment of the invention.
Figure 2:
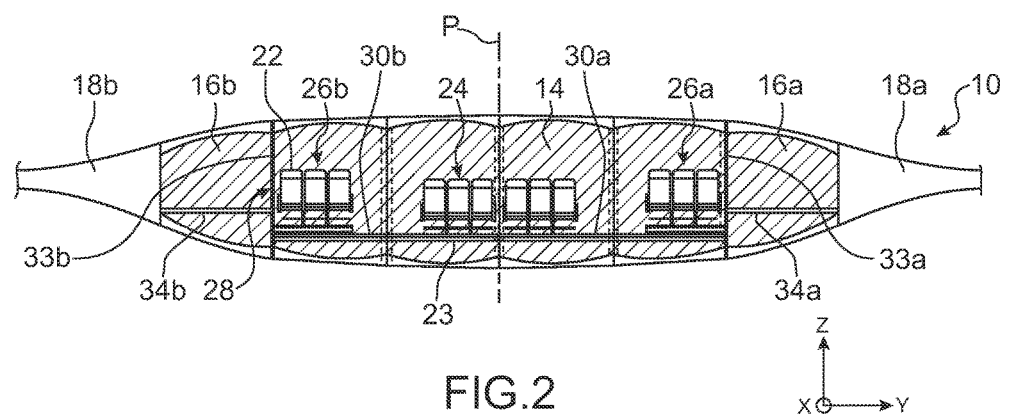
FIG. 2 is a partial transverse section schematic view of the flying wing of FIG. 1 in plan II-II of this FIG. 1.
Figure 3:
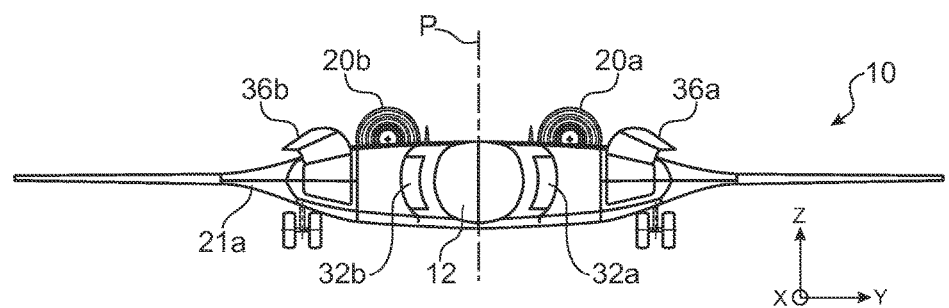
FIG. 3 is a schematic view from the front, of the flying wing of FIG. 1.

FIGS. 1 to 3 illustrate a flying wing 10 intended for commercial routes of the short-haul type.

Throughout this description the longitudinal direction of flying wing 10, i.e., its forward direction, is called X, the vertical direction of flying wing 10, i.e., the direction of height perceived by a passenger on board the flying wing, is called Z, and the transverse direction orthogonal to the longitudinal direction X and vertical direction Z is called Y.

This flying wing includes a cockpit 12, a passenger cabin 14, and two lateral holds 16a and 16b, together with two fuel tanks 18a and 18b, and two turboshaft engines 20a and 20b positioned to the aft of the flying wing. In addition, flying wing 10 has a leading edge 21a and a trailing edge 21b.

Cockpit 12 and passenger cabin 14 and lateral holds 16a, 16b jointly define a pressurized space of flying wing 10.

Passenger cabin 14 includes passenger seats 22 which are resting on a floor 23 (FIG. 2) and which are distributed in a central longitudinal space 24, and in two lateral longitudinal spaces 26a and 26b (FIGS. 1 and 2). In each of these longitudinal spaces 24, 26a, 26b, the seats are positioned in transverse rows 28. In the illustrated example the number of passenger seats is equal to 182.

Passenger cabin 14 also includes two longitudinal corridors 30a and 30b which run between central longitudinal space 24 and each of lateral longitudinal spaces 26a and 26b respectively, and which join at the forward and aft ends of the passenger cabin.

Central longitudinal space 24 and/or lateral longitudinal spaces 26a and 26b can be traversed by rigidification structures, such as ribs or connecting rods, connecting a floor of the passenger cabin to an upper portion of the fuselage. Such rigidification structures can then be incorporated in partitions, where the latter may then divide corresponding longitudinal space 24, 26a, 26b into several regions.

Passenger cabin 14 is fitted with two passenger access doors 32a and 32b (visible in the closed position in FIGS. 1 and 3). These passenger access doors 32a and 32b are incorporated in leading edge 21a, and are positioned respectively either side of a median vertical plane P of the flying wing, i.e., a plane parallel to longitudinal direction X and vertical direction Z, dividing flying wing 10 into two roughly symmetrical portions. In the illustrated example, passenger cabin 14 is constructed such that it is symmetrical relative to plane P. In particular, the passenger access doors 32a and 32b of passenger cabin 14 are arranged symmetrically relative to plane P.

As is shown by FIGS. 1 and 2, lateral holds 16a and 16b are positioned respectively both sides of passenger cabin 14.

The flying wing is of the simple deck type and in particular has no hold beneath passenger cabin 14.

Passenger cabin 14 is delimited either side by a vertical partition 33a, 33b which separates it from corresponding lateral hold 16a, 16b.

Each lateral hold, intended for the transport of passenger luggage and/or for goods transport, includes a floor 34a, 34b (FIG. 2) which extends to a height greater than or equal to that of floor 23 of passenger cabin 14. In the illustrated example the floor 34a, 34b of each hold is flat, and thus extends to a height greater than that of floor 23 of passenger cabin 14. As a variant, floor 34a, 34b of each hold may take the form of a staircase in order to conform as closely as possible to the exterior profile of flying wing 10 as viewed in transverse section.

The lateral holds are fitted with respective hold access doors 36a, 36b (visible in the open position in FIGS. 1 and 3). These access doors 36a and 36b are incorporated in leading edge 21a, and are positioned respectively symmetrically either side of median vertical plane P of the flying wing.

Each passenger access door 32a, 32b of passenger cabin 14 is thus positioned between plane P and an hold access door 36a, 36b of a corresponding lateral hold 16a, 16b.

Each lateral hold 16a, 16b may include a container-attaching system, which may be of a known type (not visible in the figures).

Fuel tanks 18a and 18b are positioned laterally beyond lateral holds 16a and 16b respectively. Each lateral hold 16a, 16b is thus interposed between passenger cabin 14 and a corresponding fuel tank 18a, 18b.

Figure 4:
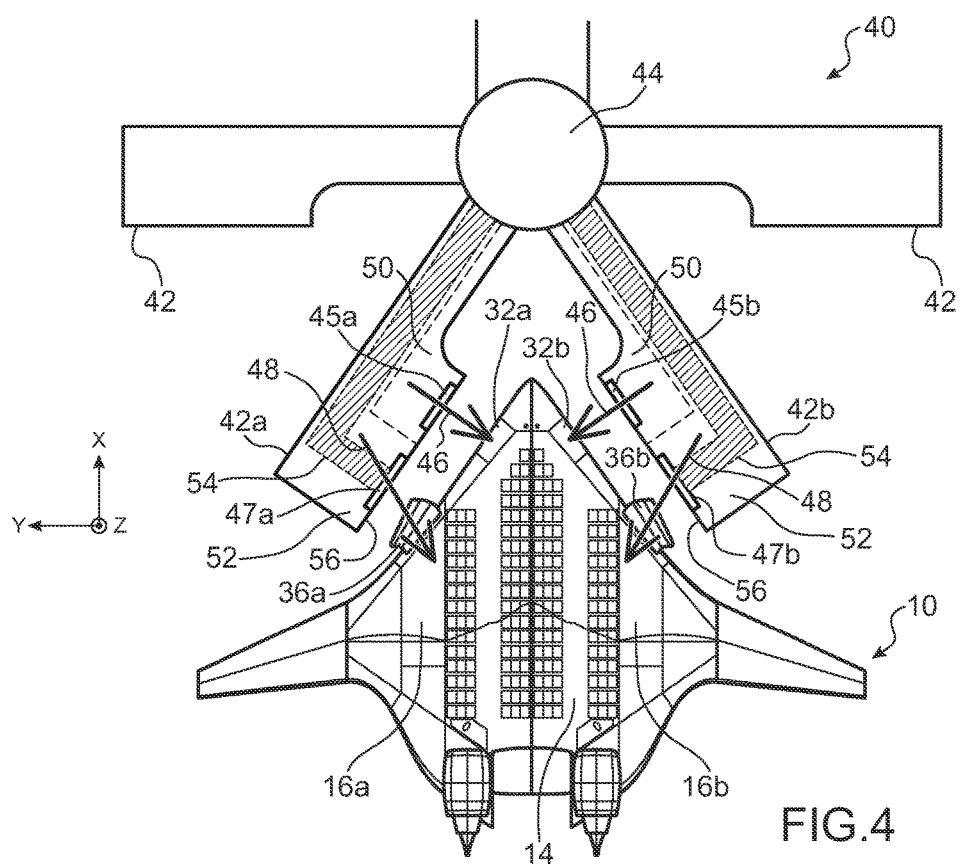
FIG. 4 is a schematic top view of a boarding and deplaning airport installation, together with the flying wing of FIG. 1 parked at said airport installation.

FIG. 4 illustrates a portion of an installation 40 for boarding and deplaning in an airport, such as an airport terminal, including several access structures 42, such as mobile loading bridges, which are for example positioned in a star formation and connected to a central hall 44. Two of these mobile loading bridges 42a and 42b are positioned in a V shape, and symmetrically, and are designed to allow passenger boarding and deplaning, and also loading and unloading of luggage and/or goods, to/from a flying wing 10 of the type described above.

To this end, each of these access structures 42a, 42b includes a passenger transit space 50 and also a transit space for luggage and/or goods 52, fitted with an electromechanical conveyor system 54, where the latter may be of a known type. In addition, each of these access structures 42a, 42b has a facade 56 including two doors positioned side-by-side, including a passenger door 45a, 45b leading to passenger transit space 50, and a luggage and/or goods door 47a, 47b leading to transit space for luggage and/or goods 52.

In addition, a flying wing 10 of the type described above may adopt a parking position as illustrated in FIG. 4, in which a forward portion of the flying wing, in particular a forward portion of its leading edge 21a, is positioned between the two access structures 42a and 42b.

In this manner each of the two passenger access doors 32a, 32b of passenger cabin 14 may be positioned opposite corresponding passenger door 45a, 45b of each access structure 42a, 42b for passengers to pass through, as illustrated by numeral reference 46, while each of the two respective hold access doors 36a, 36b of lateral holds 16a, 16b may simultaneously be positioned opposite corresponding luggage and/or goods door 47a, 47b of each access structure 42a, 42b for the loading/unloading, 48, of luggage and/or goods.

Through the use of installation 40 described above, flying wing 10 thus offers possibilities for optimized loading and unloading, allowing economies of time, and therefore reduced cost of use of the flying wing.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A flying wing for passenger transport comprising:
a leading edge;
a passenger cabin fitted with multiple passenger seats; and
a first hold and a second hold, positioned laterally outwardly respectively on either side of said passenger cabin for transporting luggage and/or goods, wherein each of the first hold and the second hold is fitted with at least one hold access door incorporated in the leading edge of said flying wing and leading to the hold, wherein each of the first hold and the second hold is delimited by a respective floor opposite a ceiling wherein the respective floor is located at a height above that of a floor of said passenger cabin,
wherein the flying wing is devoid of any hold for transporting luggage and/or goods under the passenger cabin.

2. The flying wing according to claim 1, in which each of the first hold and the second hold is interposed between said passenger cabin and a fuel tank.

3. The flying wing according to claim 1, wherein said flying wing is a simple deck flying wing.

4. The flying wing according to claim 1, in which said passenger cabin is fitted with at least one passenger access door incorporated in the leading edge of said flying wing and positioned next to one of said at least one hold access door.

5. The flying wing according to claim 1, in which:
said passenger cabin includes at least one pair of passenger access doors positioned respectively either side of a median vertical plane of said flying wing, each of the two passenger access doors being incorporated in the leading edge of said flying wing and positioned next to one of said at least one hold access door of the corresponding hold.

6. The flying wing according to claim 5, wherein:
said seats of said passenger cabin are distributed in a central longitudinal space and in two lateral longitudinal spaces,
said passenger cabin includes two longitudinal corridors respectively separating said central longitudinal space from each of said lateral longitudinal spaces,
the two passenger access doors of said at least one pair of passenger access doors are positioned so as to lead respectively to said two longitudinal corridors.

7. The flying wing of claim 1 wherein a laterally outermost portion of said floor of said passenger cabin in positioned at a height equal to a height of a laterally innermost portion of said floor of said passenger cabin.

8. A flying wing for passenger transport comprising:
a leading edge;
a passenger cabin fitted with multiple passenger seats; and
a first hold and a second hold, positioned laterally outwardly respectively on either side of said passenger cabin for transporting luggage and/or goods, wherein each of the first hold and the second hold is fitted with at least one hold access door incorporated in the leading edge of said flying wing and leading to the hold, wherein each of the first hold and the second hold is delimited by a respective floor opposite a ceiling wherein the respective floor is located at a height above or equal to that of a floor of said passenger cabin,
wherein the flying wing is devoid of any hold for transporting luggage and/or goods under the passenger cabin, and
wherein the leading edge is fitted with at least one passenger access door, wherein the multiple passenger seats rest on the floor of the passenger cabin, wherein first and second vertical partitions separate the passenger cabin from the first and second holds, respectively, and wherein each hold access door leads directly to one of the first or second hold, and each respective floor of the first and second holds is located at a height above the floor of the passenger cabin.

9. A flying wing for commercial passenger transport comprising:
a leading edge;
a passenger cabin fitted with multiple passenger seats; and
a first hold and a second hold for transporting luggage and/or goods, wherein the first and second holds of said flying wing are positioned laterally outwardly relative to said passenger cabin respectively on either side of said passenger cabin in laterally outwardly regions of the flying wing where an exterior profile of the flying wing tapers relative to the passenger cabin in any transverse cross-sectional view along the flying wing, and wherein each of the first hold and the second hold is fitted with at least one hold access door incorporated in the leading edge of said flying wing and leading to the hold, wherein each of the first hold and the second hold is delimited by a respective floor opposite a ceiling wherein the respective floor is located at a height above or equal to that of a floor of said passenger cabin,
wherein the flying wing is devoid of any hold for transporting luggage and/or goods under the passenger cabin.

* * * * *